(12) United States Patent
Bohling et al.

(10) Patent No.: US 9,856,372 B2
(45) Date of Patent: Jan. 2, 2018

(54) IN SITU PREPARATION OF A BIMORPHOLOGICAL LATEX

(71) Applicant: Rohm and Haas Company, Philadelphia, PA (US)

(72) Inventors: James C. Bohling, Lansdale, PA (US); Arnold S. Brownell, Lansdale, PA (US); Wei Gao, Fort Washington, PA (US); Yogesh Tiwary, Bangalore (IN)

(73) Assignee: Rohm and Haas Company, Philadelphia, PA (US)

( * ) Notice: Subject to any disclaimer, the term of this patent is extended or adjusted under 35 U.S.C. 154(b) by 180 days.

(21) Appl. No.: 15/075,241

(22) Filed: Mar. 21, 2016

(65) Prior Publication Data

US 2016/0280903 A1    Sep. 29, 2016

Related U.S. Application Data

(60) Provisional application No. 62/137,308, filed on Mar. 24, 2015.

(51) Int. Cl.

| | |
|---|---|
| *C08L 33/12* | (2006.01) |
| *C08F 2/22* | (2006.01) |
| *C08L 43/02* | (2006.01) |
| *C09D 4/06* | (2006.01) |
| *C08F 220/18* | (2006.01) |
| *C08F 265/06* | (2006.01) |
| *C09D 151/00* | (2006.01) |
| *C08L 33/08* | (2006.01) |

(52) U.S. Cl.
CPC ............... *C08L 33/12* (2013.01); *C08F 2/22* (2013.01); *C08F 220/18* (2013.01); *C08F 265/06* (2013.01); *C08L 33/08* (2013.01); *C08L 43/02* (2013.01); *C09D 4/06* (2013.01); *C09D 151/003* (2013.01); *C08L 2207/53* (2013.01)

(58) Field of Classification Search
CPC .................................. C08L 43/02; C08F 2/22
See application file for complete search history.

(56) References Cited

U.S. PATENT DOCUMENTS

| | | | |
|---|---|---|---|
| 6,818,697 B2 | 11/2004 | Zhang et al. | |
| 7,179,531 B2 | 2/2007 | Brown et al. | |
| 9,303,161 B2 * | 4/2016 | Bohling | C08F 2/001 |
| 2015/0005446 A1 | 1/2015 | Bohling et al. | |
| 2015/0011695 A1 | 1/2015 | Bohling et al. | |
| 2015/0315406 A1 | 11/2015 | Bohling et al. | |

FOREIGN PATENT DOCUMENTS

| | | | | |
|---|---|---|---|---|
| WO | WO-2013116318 A1 * | 8/2013 | | C08F 2/001 |
| WO | 2014/088873 A1 | 6/2014 | | |

* cited by examiner

*Primary Examiner* — Vickey Nerangis
(74) *Attorney, Agent, or Firm* — Reid S. Willis

(57) ABSTRACT

The present invention relates to an in situ method for preparing a bimorphological aqueous dispersion of first polymer particles with protuberating phosphorus acid cores and second polymer particles without protuberating cores. The method provides a more efficient way of making compositions for pigmented coating formulations.

12 Claims, No Drawings

IN SITU PREPARATION OF A BIMORPHOLOGICAL LATEX

The present invention relates to the in situ preparation of an aqueous dispersion of polymer particles with two distinct morphologies, i.e., a bimorphological latex. This latex is useful as a binder in coatings formulations.

Titanium dioxide ($TiO_2$) is an expensive component in many pigmented coatings formulations. The efficacy of $TiO_2$ as a hiding pigment is reduced when $TiO_2$ particles are allowed to come too close together upon film formation and drying (which they tend to do). The spacing of $TiO_2$ and its resultant efficiency can be improved using an adsorbing emulsion polymer. For example, U.S. Pat. No. 7,179,531 (Brown et al.) discloses a dispersion of multistage polymer particles characterized by a relatively small core portion protuberating from a relatively large shell portion of each particle, with the core portion being preferentially functionalized with $TiO_2$-adsorbing groups, typically phosphorus acid functionalized groups. These so-called "acorn" particles are disclosed as being useful for preparing $TiO_2$-polymer composite particles that provide dried coatings with improved hiding.

More recently, US 2015/0005446A1 (Bohling et al.) demonstrated a way of preferentially focusing the phosphorus acid functionality to the protuberating core portion of the acorn particle, thereby reducing flocculation that can occur from inadvertent phosphorus acid incorporation at the surface of the shell portion.

US 2015/0011695 (Bohling et al.) describes a bimodal adsorbing latex designed to increase solids content while retaining the advantages of hiding achieved with the adsorbing polymer particle technology.

The discovery of $TiO_2$-adsorbing polymer particles to improve hiding efficiency represents a major advance in coatings technology; nevertheless, inasmuch as current processes require that $TiO_2$ particles be combined with far more adsorbing polymer particles than is necessary to maximize spacing between the particles, the flexibility of usage of the relatively inexpensive letdown binder is limited. It would therefore be an advantage in the art of coating compositions to discover a way to both optimize spacing between pigment particles and, at the same time, provide a way to "dial in" the desired amount of non-adsorbing letdown binder.

SUMMARY OF THE INVENTION

The present invention provides an advance in the art of coating compositions by providing an in situ method for preparing a bimorphological aqueous dispersion of polymer particles comprising the steps of:
a) mixing together an aqueous dispersion of phosphorus acid-functionalized acrylic-based first seed polymer particles having a volume average particle size in the range of from 40 nm to 85 nm with an aqueous dispersion of acrylic-based second seed polymer particles comprising a substantial absence of phosphorus acid functionality and having a volume average particle size in the range of from 20 nm to 80 nm;
b) contacting monomers with the aqueous dispersions of the first and second seed polymer particles under emulsion polymerization conditions to form a dispersion of 1) polymer particles with a protuberating phosphorus acid functionalized core; and 2) polymer particles without a protuberating core; and
wherein the weight-to-weight ratio of particles with the protuberating phosphorus acid functionalized core to particles without a protuberating core is in the range of 25:75 to 75:25.

The present invention provides an efficient one-step pathway for controlling the relative amounts of $TiO_2$-adsorbing and non-adsorbing polymer particles for pigmented coating formulations.

DETAILED DESCRIPTION OF THE INVENTION

The present invention provides an in situ method for preparing a bimorphological aqueous dispersion of polymer particles comprising the steps of:
a) mixing together an aqueous dispersion of phosphorus acid-functionalized acrylic-based first seed polymer particles having a volume average particle size in the range of from 40 nm to 85 nm with an aqueous dispersion of acrylic-based second seed polymer particles comprising a substantial absence of phosphorus acid functionality and having a volume average particle size in the range of from 20 nm to 80 nm;
b) contacting monomers with the aqueous dispersions of the first and second seed polymer particles under emulsion polymerization conditions to form a dispersion of 1) polymer particles with a protuberating phosphorus acid functionalized core; and 2) polymer particles without a protuberating core; and
wherein the weight-to-weight ratio of particles with the protuberating phosphorus acid functionalized core to particles without a protuberating core is in the range of 25:75 to 75:25.

As used herein, the term "acrylic-based" refers to polymer particles (including seed polymer particles) that comprise at least 30 weight percent, based on the weight of the polymer particles, structural units of one or more methacrylate monomers such as methyl methacrylate and ethyl methacrylate, and/or one or more acrylate monomers such as ethyl acrylate, butyl acrylate, 2-propylheptyl acrylate, and 2-ethylhexyl acrylate. The acrylic-based polymers may also include structural units of other non-acrylate or methacrylate monomers such as styrene.

As used herein, the term "structural unit" of the named monomer refers to the remnant of the monomer after polymerization. For example, a structural unit of methyl methacrylate is as illustrated:

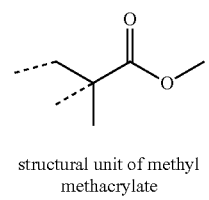

structural unit of methyl methacrylate where the dotted lines represent the points of attachment of the structural unit to the polymer backbone.

The aqueous dispersion of the first seed polymer particles is advantageously prepared by emulsion polymerization of monomers comprising a) methyl methacrylate or styrene or a combination thereof, preferably methyl methacrylate; b) one or more acrylates selected from the group consisting of ethyl acrylate, butyl acrylate, 2-propylheptyl acrylate, and 2-ethylhexyl acrylate; and c) a phosphorus acid monomer or a salt thereof. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates. PEM, which is an especially preferred phosphorus acid monomer, is represented by the following structure:

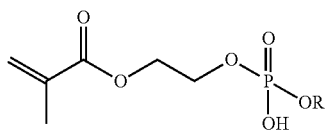

where R is H or

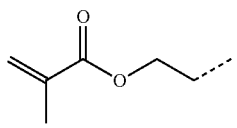

A carboxylic acid monomer or a sulfur acid monomer, or salts thereof or combinations thereof are preferably included in the emulsion polymerization of the first seed polymer particles. Examples of suitable carboxylic acid monomers include acrylic acid, methacrylic acid, and itaconic acid, and salts thereof; examples of suitable sulfur acid monomers include sulfoethyl methacrylate, sulfopropyl methacrylate, styrene sulfonic acid, vinyl sulfonic acid, and 2-acrylamido-2-methyl propanesulfonic acid, and salts thereof.

A multiethylenically unsaturated monomer such as allyl methacrylate or divinyl benzene is more preferably included in the emulsion polymerization of the first seed polymer particles.

Preferably, the first seed polymer particles comprise, based on the weight of the first seed polymer particles: a) 2 to 12 weight percent structural units of a phosphorus acid monomer or a salt thereof; b) from 0.5 to 20 weight percent structural units of a carboxylic acid monomer or a sulfur acid monomer or a salt thereof or a combination thereof; c) from 0.1 to 30 weight percent structural units of a multiethylenically unsaturated monomer; and d) a sufficient concentration of structural units of one or more polymerizable ethylenically unsaturated bulk monomers so that the pre-formed polymer particles have a $T_g$, as calculated by the Fox equation, in the range of from −50° C., preferably from −40° C., more preferably from −20° C.; to 75° C., preferably to 30° C., and more preferably to 20° C.

More preferably, the first seed polymer particles comprise, based on the weight of the first seed polymer particles: a) 3 to 8 weight percent structural units of PEM or a salt thereof; b) from 1 to 5 weight percent structural units of acrylic acid or methacrylic acid or a salt thereof; c) from 0.2 to 5 weight percent structural units of allyl methacrylate; d) from 50 to 65 weight percent structural units of butyl acrylate; and e) 25 to 45 weight percent structural units of methyl methacrylate.

The volume average particle size of the first seed polymer particles, as measured by a BI-90 Plus particle size analyzer, is from 40 nm, preferably from 45 nm, more preferably from 55 nm, and most preferably from 60 nm, to 85 nm, preferably to 80 nm.

The aqueous dispersion of the second seed polymer particles is advantageously prepared by emulsion polymerization of a) methyl methacrylate or styrene or a combination thereof, preferably methyl methacrylate; b) one or more acrylates selected from the group consisting of ethyl acrylate, butyl acrylate, 2-propylheptyl acrylate, and 2-ethylhexyl acrylate; and c) a substantial absence of a phosphorus acid monomer.

As used herein, the term "a substantial absence of a phosphorus acid monomer" refers to not more than 1 weight percent, preferably not more than 0.5 weight percent, more preferably not more than 0.1 weight percent, and most preferably 0 weight percent phosphorus acid monomer, based on the weight of the second seed polymer particles.

A carboxylic acid monomer or a sulfur acid monomer, or salts thereof or combinations thereof are preferably included in the emulsion polymerization of the second seed polymer particles.

Preferably, the monomers comprise, based on the weight of the monomers: a) methyl methacrylate or styrene or a combination thereof; b) one or more acrylate monomers selected from the group consisting of ethyl acrylate, butyl acrylate, 2-propylheptyl acrylate, and 2-ethylhexyl acrylate; and c) a substantial absence of a phosphorus acid monomer, based on the weight of the monomers.

More preferably the monomers comprise: a) from 40, more preferably from 45, to 60, more preferably to 55 weight butyl acrylate or 2-ethylhexyl acrylate or a combination thereof; b) from 40, more preferably from 45, to 60, more preferably to 55 weight percent methyl methacrylate or styrene or a combination there; c) from 0.1 to 5 weight percent acrylic acid or methacrylic acid or sodium 4-vinylbenzenesulfonate or 2-acrylamido-2-methyl propanesulfonic acid or salts thereof or combinations thereof; e) from 0.1 to 5 weight percent ureido methacrylate; and f) 0 weight percent of a phosphorus acid monomer.

The volume average particle size of the second seed polymer particles, as measured by a BI-90 Plus particle size analyzer, is from 20, preferably from 30 nm, more preferably from 40 nm, to 80 nm, preferably to 70 nm, and more preferably to 60 nm.

The aqueous dispersions of the first and second seed polymer particles are mixed together at a first-to-second seed polymer particles weight-to-weight ratio of preferably from 1:2, more preferably from 1:1, to preferably 10:1, more preferably 5:1, and most preferably to 3:1. The mixture is then contacted with the monomers, preferably an aqueous emulsion of the monomers under emulsion polymerization conditions to form polymer particles with a protuberating phosphorus acid functionalized core and polymer particles without a protuberating core.

Preferably, the monomers have the same monomer profile as the second seed polymer particles, which means that the monomers that are used to prepare the second seed polymer are preferably the same and in the same proportions as the monomers fed to the reactor. The subsequently formed shells of the protuberating polymer particles and the particles without protuberating cores have substantially identical compositions: They are identical when the monomer profile of the monomers is the same as the second seed polymers, and almost identical when the profiles are different.

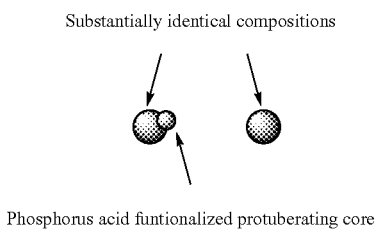

Substantially identical compositions

Phosphorus acid funtionalized protuberating core

In a most preferred method of making the bimorphological composition, a portion of the monomer emulsion (~1 to 10 weight percent of the total monomers in the monomer emulsion) is polymerized under emulsion polymerization conditions to form the aqueous dispersion of the second seed polymer particles. Alternatively, the first and second seed polymer particles can be formed independently in separate reactors. In either case, the first and second seeds must have different compositions to form the bimorphological latex. The aqueous dispersions of the first and second seed polymer particles are then combined, followed by addition of the remainder of the monomer emulsion, followed by emulsion polymerization. The concentration of first seed polymer particles is preferably from 2 to 10 weight percent based on the weight of the total monomers in the subsequently added monomer emulsion.

The resultant dispersion of bimorphological polymer particles, that is, polymer particles with and without a phosphorus acid functionalized protuberating core, preferably have a weight-to-weight ratio of particles with a protuberating core to particles without a protuberating core in the range of from 30:70, more preferably from 50:50, most preferably from 55:45, to preferably 68:32, and more preferably to 65:35. The volume average particle size of the polymer particles with the protuberating core is in the range of from 110, preferably from 120 nm to 160, preferably to 150 nm; and the volume average particle size of the particles without a protuberating core is in the range of from 70, more preferably from 80, and most preferably from 85 nm, to 140, more preferably to 130 nm, as determined by Asymmetric Flow Field Flow Fractionation. Preferably, the ratio of the volume average particle size of the protuberating core particles to the non-protuberating core particles is from 1.45:1, more preferably from 1.42:1 to 0.9:1, more preferably to 1:1, more preferably to 1.1:1, and most preferably to 1.2:1.

The aqueous dispersion of bimorphological particles is advantageously combined with pigment particles such as $TiO_2$ particles to form a dispersion of first polymer particles, as least some of which adsorb to the $TiO_2$ particles, and second polymer particles, at least some of which do not adsorb to the $TiO_2$ particles. Accordingly, the present invention provides an efficient way to prepare coating compositions with desired levels of adsorbing and letdown binder. The coating composition further advantageously includes one or more of the following components: defoamers, surfactants, dispersants, rheology modifiers, and neutralizing agents.

EXAMPLES

Measurements of Particle Size and Weight Ratios Using AFFFF

AFFFF flow regulation was controlled using Eclipse 3+ (Wyatt Technology). Data from UV and multiangle light scattering (MALS, DAWN HELEOS, Wyatt Technology) detectors were collected and processed by Astra 6.1.2.76 software (Wyatt Technology). Latex samples were diluted 1000-fold and 100-nm and 150-nm polystyrene NIST traceable particle size standards (Nanosphere standards from Thermo Scientific) were diluted 100-fold with purified water. The separation channel dimensions were 15.2 cm in length and tapered from 2.15 to 0.3 cm in width, with a 350-μm thickness spacer, and an ultrafiltration membrane regenerated cellulose with a 10-kDa cutoff (Wyatt Technology). The 90-degree MALS detector was calibrated with HPLC grade toluene; the detectors at other angles were normalized using the peak maximum of the 100-nm standard using the sphere model.

Resolution and fractionation power, which measure the degree of separation between two components, can be determined based on the elution profile for the standards using equations disclosed in Schimpf, M. E., Resolution and Fractionating Power. in *Field-Flow Fractionation Handbook*, Schimpf, M.; Caldwell, K.; Giddings, J. C., Eds. Wiley Interscience: New York, 2000; pp 71-94. Resolution ($R_s$) of components is defined by the following equation:

$$R_s = \frac{\delta t_r}{4\overline{\sigma}_t}$$

Where $\delta t_r$ is the difference in retention time between the two components and $\overline{\sigma}_t$ is the average standard deviation of the two component zones in units of time.

Diameter based Fractionating Power ($F_d$) is the resolution between particles whose average diameter (d) differ by the relative increment $\delta d/d$, as calculated by the following equation:

$$F_d = \frac{R_s}{\delta d/d}$$

The Resolution for the standards should be ≥2 and the Fractionating Power should be ≥5. For the 100-nm and 150-nm polystyrene standards used in the present analysis, the Resolution and Fractionating Power were 2.2 and 5.6 respectively.

The mobile phase used for AFFFF analysis was 0.1% of Fisherbrand FL-70 solution (Fisher Scientific). The following flow rates were used for all samples: Detector Flow: 0.7 mL/min; Focus Flow: 2 mL/min; Inject Flow: 0.2 mL/min.

Initial hold time before injection: 1 min, 0 crossflow; focus: 1 min; focus and injection: 1 min; focus: 1 min; elution: 10 min at 1 mL/min crossflow; elution: 30 min ramped crossflow from 1 mL/min to 0.5 mL/min; elution 6 min, 0 crossflow.

Latex samples were diluted 1000-fold with purified water prior to injection (20 μL) into the AFFFF analyzer for characterization. The MALS data collection rate was 1 s/data point. Purified water also injected into the analyzer to obtain blanks for UV baseline subtraction. Latex particle sizes were obtained by MALS using the sphere model. The area:area ratio of particle sizes (assumed to be the same as weight:weight ratio) were determined by fitting overlapping UV curves (220 nm) into two Gaussian peaks.

Example 1—Preparation of Bimorphological Polymer Particles

A. Core (Preform) Synthesis

A first monomer emulsion was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion, followed by a rinse (25 g), and an initiator solution of sodium persulfate (0.64 g) dissolved in deionized water (50 g) were added linearly and separately over 40 min. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size using a Brookhaven BI 90 Plus particle analyzer was 60-75 nm and the solids were 40%.

B. Acorn Core-Shell Synthesis

A second monomer emulsion was prepared using deionized water (400 g), sodium dodecylbenzene sulfonate (55.4 g, 23% active), Disponil FES 993 surfactant (48.17 g, 30% active), butyl acrylate (775.2 g), methyl methacrylate (797.33 g), ureido methacrylate (44.2 g, 50% active), acrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (850 g) and Disponil FES 993 surfactant (5.65 g, 30% active). The contents of the flask were heated to 84° C. under $N_2$ and stirring was initiated. A portion of the second monomer emulsion (75 g, 3.5% of total monomer) was then added, quickly followed by an aqueous solution of ammonium persulfate (5.1 g) dissolved in deionized water (25 g) followed by a rinse of deionized water (5 g). After stirring for 10 min, a portion of the pre-form from Step A was then added (212.5 g 5.0% of total monomer), followed by addition of the remainder of the second monomer emulsion and then a solution containing ammonium persulfate (1.7 g) and ammonium hydroxide (5 g, 29% active) dissolved in deionized water (55 g), each added linearly and separately to the flask over a total period of 80 min. The contents of the flask were maintained at a temperature of 84° C. during the addition of the second monomer emulsion. When all additions were complete, the flask containing the second monomer emulsion was rinsed with deionized water (25 g), which was then added to the flask.

The contents of the flask were cooled to 65° C. and a catalyst/activator pair was added to the flask to reduce residual monomer. TERGITOL™ 15-S-40 surfactant (12.15 g, 70% solids) was added. The polymer was then neutralized to pH 9 with a dilute ammonium hydroxide solution. The particle sizes, as measured by Asymmetric Flow Field Flow Fractionation (AFFFF), were 109 nm for the non-protuberating polymer particles and 139 nm for the protuberating core polymer particles; the solids were 49.5%.

Examples 2-6

The procedure used to prepared compositions of Examples 2-6 was substantially the same as described in Example 1 except that the portions of the second monomer emulsion and the pre-form were varied to achieve different w/w ratios of non-protuberating to protuberating particle particles, different particle sizes. Table 1 illustrates amounts of perform and second monomer emulsion (ME2) as a percentage of the total monomer used to prepare the particles; the particle sizes (PS) of the particles, and the w/w ratio of the non-protuberating to protuberating particles. If desired, particle size and particle size ratios can be further manipulated through control of surfactant concentration in the reactor at the onset of polymerization.

TABLE 1

Amounts, Particle Sizes, and w/w Ratios of Bimorphological Polymer Particles

| Ex. No. | % Preform | % ME2 | Non-protub PS (nm) | Protub PS (nm) | Ratio NonPro:Pro |
|---|---|---|---|---|---|
| 1 | 5.0 | 3.5 | 109 | 139 | 53.1:46.9 |
| 2 | 2.5 | 3.5 | 117 | 147 | 70.3:29.7 |
| 3 | 7.5 | 3.5 | 103 | 134 | 40.1:59.9 |
| 4 | 10.0 | 3.5 | 89 | 125 | 34.0:66.0 |
| 5 | 5.0 | 2.5 | 102 | 138 | 46.7:53.3 |
| 6 | 5.0 | 4.5 | 111 | 138 | 62.0:38.0 |

Paint formulations were prepared using the bimorphological latexes and found to have nearly identical properties (for example, hiding, KU stability, gloss, heat age stability, and rheology modifier demand) as paints formulated with separately added latexes with the different morphologies, demonstrating that the added efficiency in the preparation of the composition of the present invention does not cause adverse effects in final properties of the formulated paint.

The invention claimed is:

1. An in situ method for preparing a bimorphological aqueous dispersion of polymer particles comprising the steps of:
    a) mixing together an aqueous dispersion of phosphorus acid-functionalized acrylic-based first seed polymer particles having a volume average particle size in the range of from 40 nm to 85 nm with an aqueous dispersion of acrylic-based second seed polymer particles comprising a substantial absence of phosphorus acid functionality and having a volume average particle size in the range of from 20 nm to 80 nm;
    b) contacting monomers with the aqueous dispersions of the first and second seed polymer particles under emulsion polymerization conditions to form a dispersion of 1) polymer particles with a protuberating phosphorus acid functionalized core; and 2) polymer particles without a protuberating core; and
    wherein the weight-to-weight ratio of particles with the protuberating phosphorus acid functionalized core to particles without a protuberating core is in the range of 25:75 to 75:25.

2. The method of claim 1 wherein the phosphorus acid-functionalized acrylic-based first seed polymer particles comprise structural units of: a) methyl methacrylate or styrene or a combination thereof; b) one or more acrylate monomers selected from the group consisting of ethyl acrylate, butyl acrylate, 2-propylheptyl acrylate, and 2-ethylhexyl acrylate; and c) phosphoethyl methacrylate; and wherein the monomers comprise: a) methyl methacrylate or styrene or a combination thereof; b) one or more acrylate monomers selected from the group consisting of ethyl acrylate, butyl acrylate, 2-propylheptyl acrylate, and 2-ethylhexyl acrylate; and c) a substantial absence of a phosphorus acid monomer, based on the weight of the second seed polymer particles.

3. The method of claim 2 wherein the phosphorus acid-functionalized acrylic-based first seed polymer particles further comprise: d) structural units of a carboxylic acid monomer or a salt thereof; and e) structural units of a multiethylenically unsaturated monomer.

4. The method of claim 3 wherein the monomers further comprises a carboxylic acid monomer or a sulfur acid monomer or a salt thereof or a combination thereof.

5. The method of claim 4 wherein the phosphorus acid-functionalized acrylic-based first seed polymer particles comprise, based on the weight of the first seed polymer particles: a) 3 to 8 weight percent structural units of phosphoethyl methacrylate or a salt thereof; b) from 1 to 5 weight percent structural units of acrylic acid or methacrylic acid or a salt thereof; c) from 0.2 to 5 weight percent structural units of a multiethylenically unsaturated monomer; d) from 50 to 65 weight percent structural units of butyl acrylate; and e) 25 to 45 weight percent structural units of methyl methacrylate; and wherein the monomers are added as a monomer emulsion and comprises, based on the weight of the monomers: a) from 40 to 60 weight percent butyl acrylate or 2-ethylhexyl acrylate or a combination thereof; b) from 40 to 60 weight percent methyl methacrylate or styrene or a combination thereof; c) from 0.1 to 5 weight acrylic acid or methacrylic acid or sodium 4-vinylbenzenesulfonate or 2-acrylamido-2-methyl propanesulfonic acid or a salt thereof or a combination thereof; and d) less than 0.5 weight percent of a phosphorus acid monomer.

6. The method of claim 5 wherein the monomers have the same monomer profile as the second seed polymer particles.

7. The method of claim 1 wherein the aqueous dispersions of the first and second seed polymer particles are mixed together at a first-to-second seed polymer particles weight-to-weight ratio of from 1:2 to 10:1, wherein the monomer emulsion comprises less than 0.1 weight of a phosphorus acid monomer based on the weight of the monomer emulsion.

8. The method of claim 7 wherein the ratio of volume average particle size of the protuberating core polymer particles to the non-protuberating core polymer particle is from 1.45:1 to 0.9:1.

9. The method of claim 8 wherein the volume average particle size of the protuberating core polymer particles is in the range of from 110 to 160 nm, and the volume average particle size of the non-protuberating core polymer particles is in the range of from 70 to 140 nm.

10. The method of claim 9 wherein the ratio of volume average particle size of the protuberating core polymer particles to the non-protuberating core polymer particle is from 1.42:1 to 1.2:1; the volume average particle size of the protuberating core polymer particles is in the range of 110 to 150 nm, and the volume average particle size of the non-protuberating core polymer particles is in the range of 80 to 130 nm.

11. The method of claim 10 wherein weight-to-weight ratio of particles with the protuberating phosphorus acid functionalized core to particles without a protuberating core is in the range of 50:50 to 68:32.

12. The method of claim 1 which comprises the further step of combining the bimorphological aqueous dispersion of polymer particles with $TiO_2$ particles to form a dispersion polymer particles that are adsorbed and not adsorbed to $TiO_2$.

* * * * *